US007081810B2

(12) United States Patent
Henderson et al.

(10) Patent No.: US 7,081,810 B2
(45) Date of Patent: Jul. 25, 2006

(54) ROOF ARTICLE TRANSPORTER ASSEMBLY

(75) Inventors: Jack V. Henderson, West Bloomfield, MI (US); Keijo J. Huotari, Fenton, MI (US); Gregory A. Brower, Fenton, MI (US); Stephen R. Roddy, Harrison Township, MI (US); Mary Ann Bator, Farmington Hills, MI (US)

(73) Assignee: Decoma International Inc., Concord (CA)

( * ) Notice: Subject to any disclaimer, the term of this patent is extended or adjusted under 35 U.S.C. 154(b) by 0 days.

(21) Appl. No.: 10/761,664

(22) Filed: Jan. 21, 2004

(65) Prior Publication Data

US 2004/0150573 A1 Aug. 5, 2004

Related U.S. Application Data

(60) Provisional application No. 60/441,657, filed on Jan. 21, 2003.

(51) Int. Cl.
*B60Q 1/00* (2006.01)
*H04N 7/18* (2006.01)
*H01Q 1/32* (2006.01)

(52) U.S. Cl. ....................... 340/435; 348/148; 343/713

(58) Field of Classification Search ................ 348/148, 348/162, 164; 340/435, 436, 903, 907; 343/11–13, 343/711–713
See application file for complete search history.

(56) References Cited

U.S. PATENT DOCUMENTS

| | | | | |
|---|---|---|---|---|
| 3,154,786 | A | 10/1964 | Clanton | |
| 4,535,336 | A * | 8/1985 | Shaver | 343/713 |
| 4,769,655 | A * | 9/1988 | Nagy et al. | 343/712 |
| 4,866,453 | A * | 9/1989 | Nagy et al. | 343/712 |
| 5,048,641 | A | 9/1991 | Holcomb et al. | |
| 5,281,985 | A | 1/1994 | Chan | |
| 5,306,156 | A | 4/1994 | Gibbs et al. | |
| 5,431,570 | A | 7/1995 | Gibbs et al. | |
| 5,624,266 | A | 4/1997 | Gibbs et al. | |
| 5,629,712 | A * | 5/1997 | Adrian et al. | 343/713 |
| 5,812,095 | A * | 9/1998 | Adrian et al. | 343/713 |
| 6,067,110 | A * | 5/2000 | Nonaka et al. | 348/148 |
| 6,114,954 | A | 9/2000 | Palett et al. | |
| 6,151,539 | A * | 11/2000 | Bergholz et al. | 701/25 |
| 6,154,149 | A * | 11/2000 | Tyckowski et al. | 340/903 |
| 6,535,114 | B1 * | 3/2003 | Suzuki et al. | 340/435 |
| 6,603,434 | B1 * | 8/2003 | Lindenmeier et al. | 343/713 |
| 6,621,411 | B1 * | 9/2003 | McCarthy et al. | 340/425.5 |
| 6,626,477 | B1 * | 9/2003 | Maynard et al. | 296/24.3 |
| 6,657,589 | B1 * | 12/2003 | Wang et al. | 342/383 |
| 2002/0126056 | A1 * | 9/2002 | Zinsmeister et al. | 343/713 |
| 2002/0175868 | A1 * | 11/2002 | Reichert | 343/713 |

* cited by examiner

*Primary Examiner*—Hoang V. Nguyen
*Assistant Examiner*—Hung Tran Vy
(74) *Attorney, Agent, or Firm*—Clark Hill PLC

(57) ABSTRACT

A roof rack assembly for transporting articles along a roof of a motor vehicle includes a frame member extending along the roof. The roof rack assembly also includes an electronic component for receiving and transmitting signals to an interior portion of the motor vehicle.

1 Claim, 5 Drawing Sheets

FIG - 3
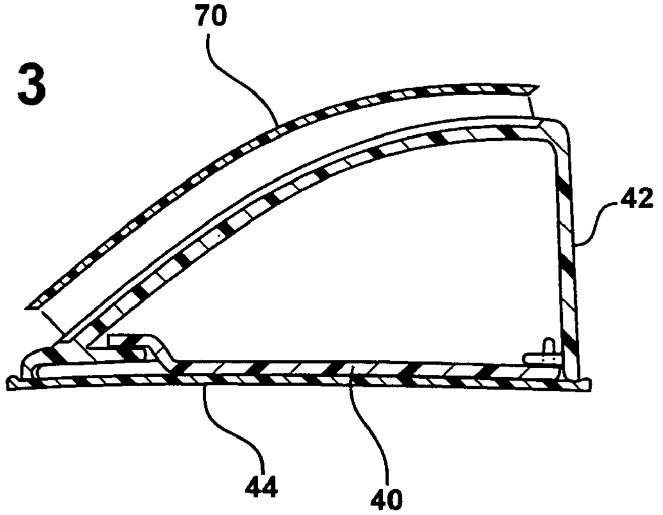
FIG - 4
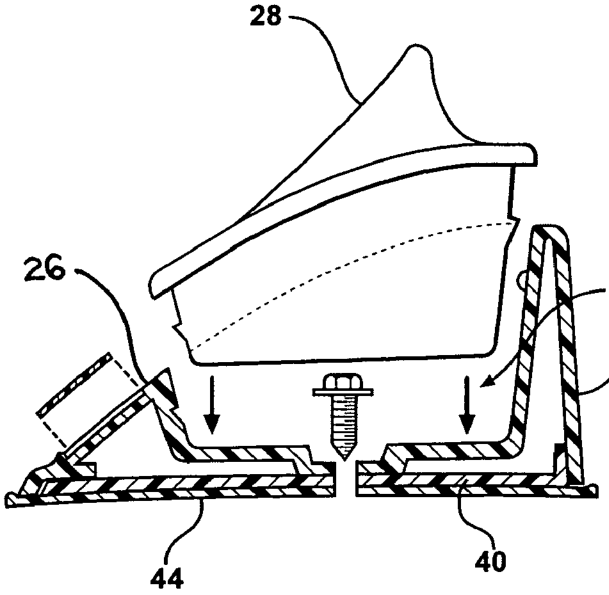
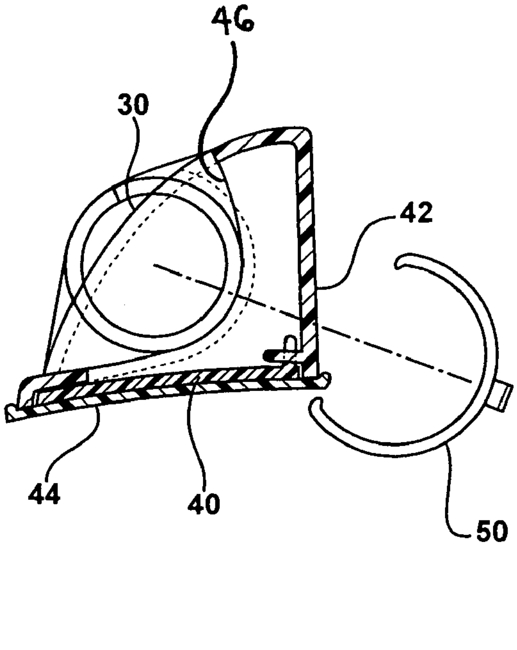
FIG - 5

ROOF ARTICLE TRANSPORTER ASSEMBLY

This application claims benefit of 60/491,657 Jan. 21, 2003.

FIELD OF THE INVENTION

This invention relates to a roof rack assembly for a motor vehicle. More particularly, the invention relates to a roof rack assembly including frame members formed to accommodate various electronic components.

DESCRIPTION OF RELATED ART

Roof racks increase the storage capacity of a motor vehicle by allowing items to be stored atop a roof of the motor vehicle. Roof racks typically include a rectangular-shaped carrier frame mounted along the roof of the motor vehicle, and a plurality of structural ribs mounted to and extending longitudinally along the roof within the carrier frame. The carrier frame includes a front frame member, a rear frame member, and side frame members extending therebetween. A plurality of cross bars extends between the side members to assist in retaining an item upon the roof during operation of the motor vehicle.

More recently, roof racks have been adapted to incorporate various mechanisms or components so that the roof rack may be utilized for more than just storing items above the roof. For example, a roof rack including a lighting mechanism is known to those skilled in the art. Such a roof rack can be provided with a turn light indicator along each corner of the carrier frame, side lights along the side frame members, and rear-facing brake lights along the rear frame member. In addition, a roof rack including an antenna, which improves television reception on a television within a passenger compartment of the motor vehicle, is also known to those skilled in the art. The roof rack that includes a television antenna has a television transformer attached to the carrier frame so that the side frame members and the plurality of cross bars define two branches of the antenna.

SUMMARY OF THE INVENTION

According to one aspect of the invention, a roof rack assembly for transporting articles along a roof of a motor vehicle includes a frame member extending along the roof. The roof rack assembly also includes an electronic component secured to the frame member for receiving and transmitting signals to an interior portion of the motor vehicle.

BRIEF DESCRIPTION OF THE DRAWINGS

Advantages of the present invention will be readily appreciated as the same becomes better understood by reference to the following detailed description when considered in connection with the accompanying drawings wherein:

FIG. 3 is a cross-sectional view taken along line 3—3 of FIG. 2;

FIG. 4 is a cross-sectional view taken along line 4—4 of FIG. 2;

FIG. 5 is a cross-sectional view taken along line 5—5 of FIG. 2;

DETAILED DESCRIPTION OF THE PREFERRED EMBODIMENT

Figure 1:
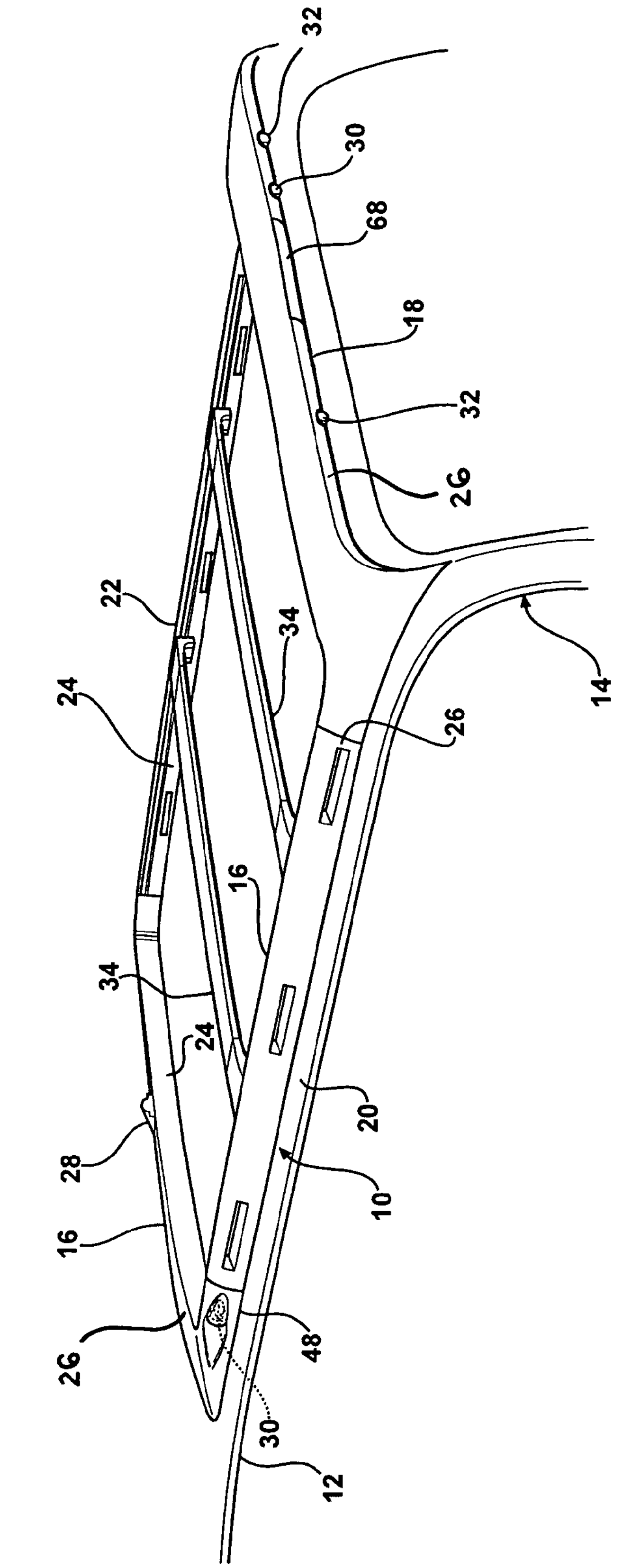
FIG. 1 is a rear perspective view of a roof rack assembly according to one embodiment of the invention mounted along a roof of a motor vehicle.

Referring to FIG. 1, a roof rack assembly is generally shown at 10 for allowing articles to be stored and transported along a roof 12 of a motor vehicle, generally indicated at 14. The roof rack assembly 10 includes a front frame member 16, a rear frame member 18, and side frame members 20, 22. Each of the frame members 16, 18, 20, 22 includes an inboard surface 24 and an outboard surface 26.

Various electronic components, including a radio frequency receiver module 28, a camera 30, and a radar sensor 32, are accommodated within the frame members 16, 18, 20, 22 of the roof rack assembly 10. It will be appreciated that the radio frequency receiver module 28, the camera 30, and the radar sensor 32 may be positioned along any of the frame members 16, 18, 20, 22. It will be further appreciated that each frame member 16, 18, 20, 22 can include more than one radio frequency module 28, more than one camera 30, and/or more than one radar sensor 32.

The frame members 16, 18, 20, 22 are formed from a thermoset or thermoplastic material and may be manufactured by injection or compression molding. In addition, the front frame member 16, the rear frame member 18, and the side frame members 20, 22 may be formed as a molded integral component.

A plurality of cross members 34 extend between the side frame members 20, 22 to assist the roof rack assembly 10 in retaining articles along the roof 12. The motor vehicle 14 includes an exterior rearview mirror 36 extending out from a side 38 to provide a motor vehicle operator with a view alongside and to the rear of the motor vehicle 14.

Referring to FIGS. 2 through 5, the front frame member 16 includes a lower panel 40, which is secured to the roof 12, and a body structure 42 secured to the lower panel 40. A sealing member 44, including but not limited to, an elastomeric gasket, extends between the lower panel 40 and the roof 12 to prevent the roof rack assembly 10 from scratching the roof 12. Although the lower panel 40 and the body structure 42 are shown with respect to the front frame member 16, it will be appreciated that the rear frame member 18 and the side frame members 20, 22 each include the lower panel 40 and the body structure 42.

Figure 2:
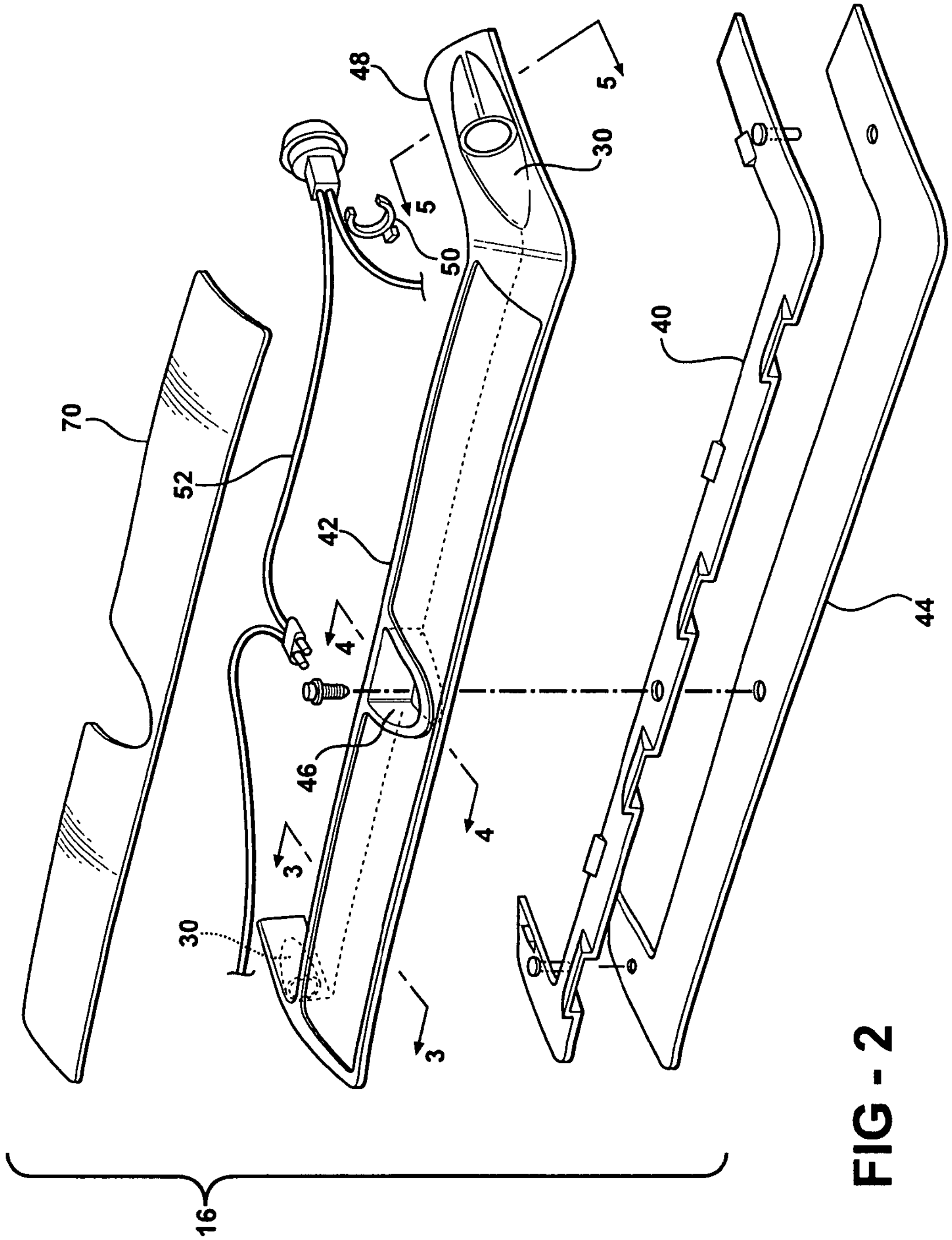
FIG. 2 is an exploded perspective view of a front frame member of the roof rack assembly.
Figure 8:
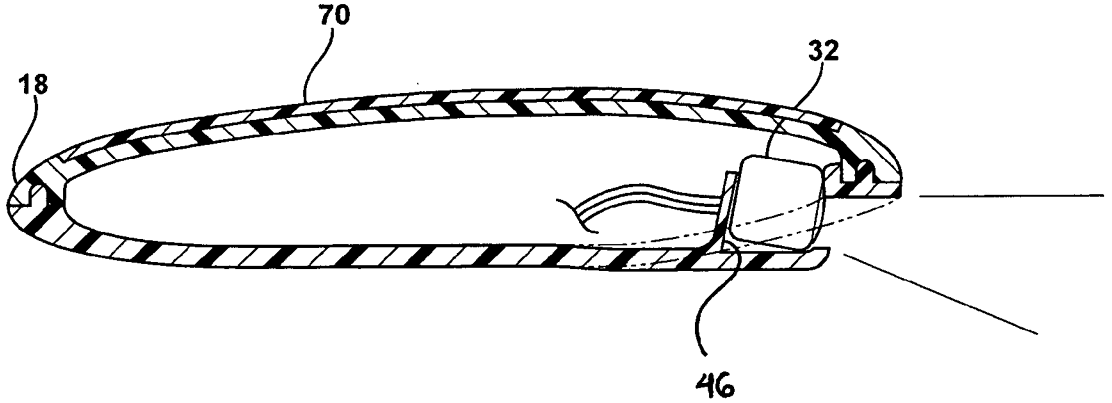
FIG. 8 is a cross-sectional view taken along line 8—8 of FIG. 7.

Referring to FIGS. 2 and 4, the radio frequency receiver module 28 is seated within a housing 46 formed in the body structure 42 of front frame member 16. The radio frequency receiver module 28 receives signals from outside the motor vehicle 14, and may be utilized for cellular phones, wireless internet systems, satellite radio, global positioning systems, and guidance systems. Various housing 46 may be formed along the outboard surface 26 of each of the frame members 16, 18, 20, 22, as shown in FIGS. 4, 5, and 8.

Referring to FIGS. 2 and 4 5, the camera 30 is seated within rearwardly extending end segments 48 of the body structure 42 of front frame member 16. A camera retainer 50 is provided to hold the camera 30 within each of the end segments 48. A wire harness 52 connects each camera 30 and the radio frequency receiver module 28 to a power source (not shown).

Figure 6:
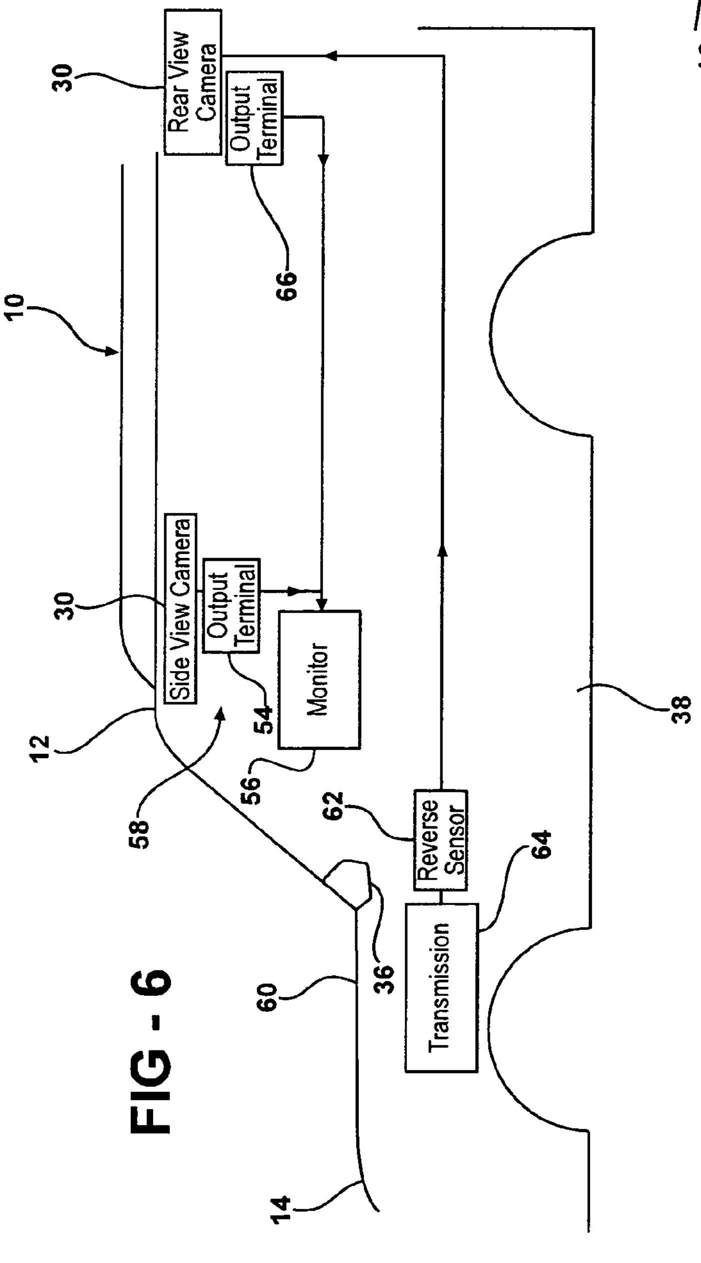
FIG. 6 is a schematic block diagram of one embodiment of the invention drawn against a profile of the motor vehicle.

The camera 30 is oriented within the front frame member 16 to create a digitized signal of a space alongside the motor vehicle 14. Referring to FIG. 6, the exterior rearview mirror 36 typically allows the motor vehicle operator to view the space alongside the motor vehicle 14. There are, however, blind spots along each side 38 that prevent the exterior rearview mirror 36 from showing a complete view along each side 38 of the motor vehicle 14. The camera 30 completes the view along one side 38 of the motor vehicle 14 and eliminates the blind spots.

The digitized signal created by the camera 30 is sent, via an output terminal 54, to a monitor 56 within a passenger compartment 58 of the motor vehicle 14. The monitor 56 may be an interior LED, a rearview interior mirror, or a display device devoted exclusively to the camera 30. Thus, the motor vehicle operator is able to view the blind spot along each side 38 of the motor vehicle 14 by viewing the monitor 56.

Figure 7:
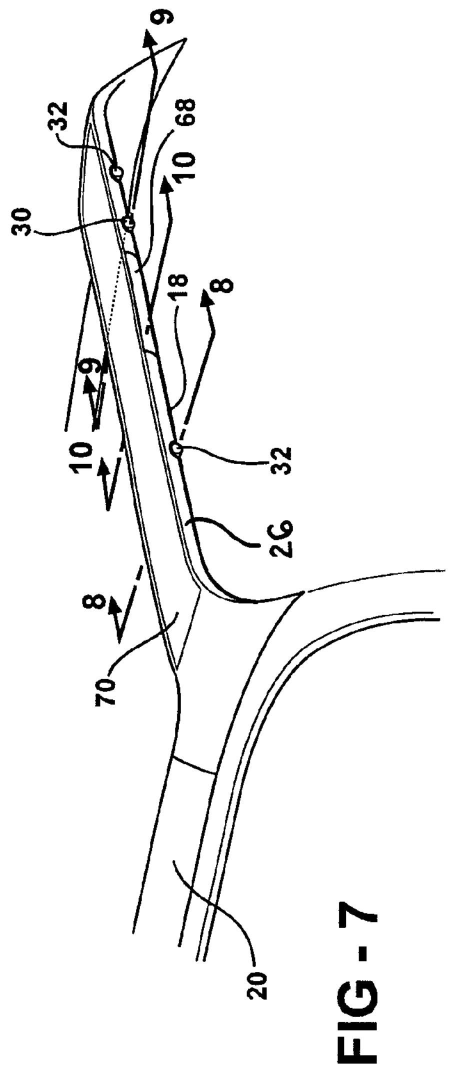
FIG. 7 is a rear perspective view of a rear frame member of the roof rack assembly.

Referring to FIGS. 7 and 8, the camera 30 is positioned along the rear frame member 18. While the camera 30 may be positioned to face outwardly at various angles, the camera in FIGS. 7 and 8 faces downwardly towards the ground in order to eliminate a blind spot immediately behind the motor vehicle 14.

Furthermore, in a preferred embodiment, the camera 30 of the rear frame member 18 is designed to operate when the motor vehicle 14 is traveling in a reverse direction. Referring back to FIG. 6, the camera 30 includes a power switch 60 for turning the camera 30 on or off. The power switch 60 is operably connected to a reverse sensor 62 designed to identify when a transmission 64 of the motor vehicle 14 is in reverse. When the transmission 64 is shifted into reverse, the reverse sensor 62 sends a reverse signal to the power switch 60 to turn the camera 30 on. And when the transmission 64 is shifted out of reverse, the reverse signal is stopped and the power switch 60 turns the camera 30 off.

After the camera 30 is turned on, the camera 30 creates the digitized signal of a rear space behind the motor vehicle 14. The digitized signal is sent, via an output terminal 66, to the monitor 56. Thus, as the motor vehicle 14 travels in the reverse direction, the motor vehicle operator is able to view the blind spot behind the motor vehicle 14 by viewing the monitor 56.

Moreover, it is contemplated that the camera 30 may be activated even before shifting the transmission 64 into reverse to allow the motor vehicle operator additional time to survey the space behind the motor vehicle 14. It is also contemplated that the camera 30 may remain on at all times.

Figure 9:
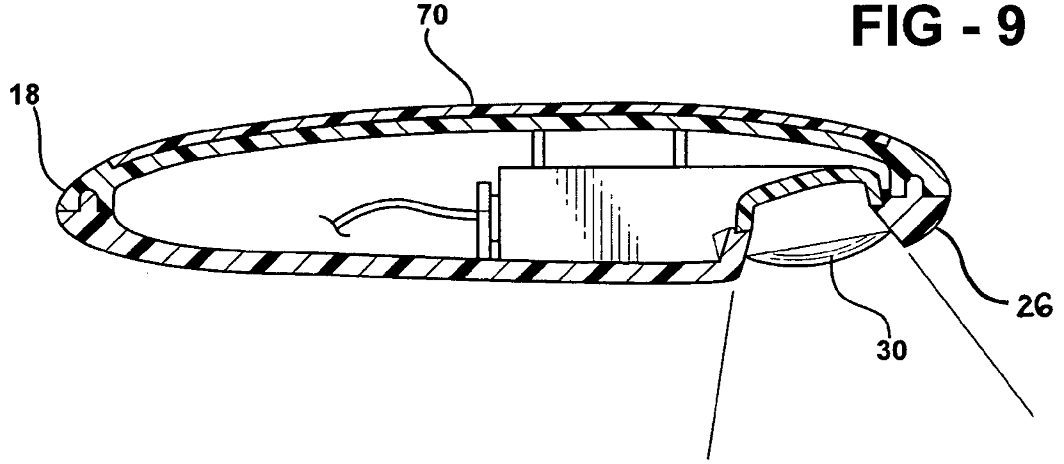
FIG. 9 is a cross-sectional view taken along line 9—9 of FIG. 7.

Referring to FIGS. 7 and 9, more than one radar sensor 32 is shown positioned along the rear frame member 18 on either side of a center high mounted stop lamp 68. The radar sensors 32 detect objects behind the motor vehicle 14 as part of a drive-by wire system or a similar computer-mediated driving system, as known to those skilled in the art.

Figure 10:
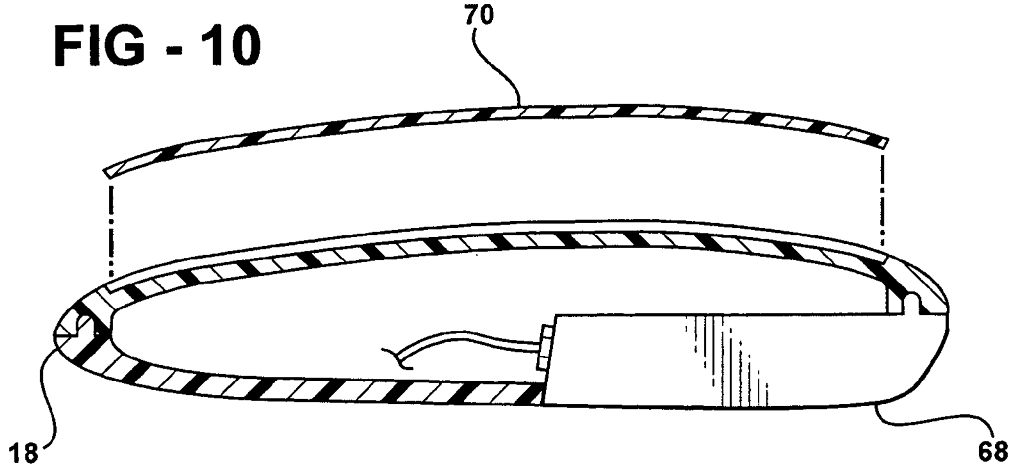
FIG. 10 is a cross-sectional view taken along line 10—10 of FIG. 7.

A solar panel 70 may be secured to the outboard surface 26 of each of the frame members 16, 18, 20, 22. The solar panel 70 receives solar energy and converts the solar energy into an electric current to provide power to various systems or components of the motor vehicle 14. Referring to FIGS. 2 and 5, the solar panel 70 is secured to the outboard surface 26 of the front frame member 16. Referring to FIGS. 7 and 10, the solar panel 70 is shown secured to the outboard surface 26 of the rear frame member 18.

The solar panel 70 extends through a similar plane as the outboard surface 26 of the front 16 and rear 18 frame members. To optimize solar panel 70 performance, the plane through which the front 16 and rear 18 frame members extends is curved, and the solar panel 70 extends through the curved plane so that the solar panel 70 is tilted relative to the horizontal plane of the ground.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A roof rack assembly for transporting articles along a roof of a motor vehicle having an interior portion, said roof rack assembly comprising:

a frame member extending along the roof; and a camera at least partially housed within said frame member to receive and create a digitized signal of a space disposed adjacent the motor vehicle and transmit said digitized signal to the interior portion of the vehicle.

* * * * *